United States Patent
Suzuki et al.

(10) Patent No.: US 7,031,662 B2
(45) Date of Patent: Apr. 18, 2006

(54) WIRELESS COMMUNICATION CIRCUIT, WIRELESS COMMUNICATION TERMINAL AND METHOD, RECORDING MEDIUM, AND PROGRAM

(75) Inventors: Mamoru Suzuki, Kanagawa (JP); Susumu Kusakabe, Tokyo (JP); Shigeru Arisawa, Tokyo (JP); Tomonori Nagano, Chiba (JP); Nishiki Mizusawa, Kanagawa (JP); Takaki Nakazawa, Tokyo (JP)

(73) Assignees: Sony Corporation, Tokyo (JP); Sony Ericsson Mobile Communications Japan, Inc., Tokyo (JP)

( * ) Notice: Subject to any disclaimer, the term of this patent is extended or adjusted under 35 U.S.C. 154(b) by 406 days.

(21) Appl. No.: 10/676,019

(22) Filed: Oct. 2, 2003

(65) Prior Publication Data
US 2004/0121739 A1   Jun. 24, 2004

(30) Foreign Application Priority Data
Oct. 22, 2002   (JP) .............................. 2002-306810

(51) Int. Cl.
*H04B 1/10* (2006.01)
*H04B 15/00* (2006.01)

(52) U.S. Cl. .................... 455/63.1; 455/78; 455/114.2; 455/295; 455/296; 375/346

(58) Field of Classification Search ................. 455/76, 455/78, 81, 88, 558, 63.1, 114, 295–296; 375/346
See application file for complete search history.

(56) References Cited

U.S. PATENT DOCUMENTS

| 5,929,683 A | * | 7/1999 | Menkhoff .................... 327/292 |
| 5,978,655 A | * | 11/1999 | Ohura et al. ................ 455/41.1 |
| 6,151,488 A | | 11/2000 | Brekelmans |
| 6,621,357 B1 | * | 9/2003 | Busch-Sorensen ........ 331/36 C |
| 6,737,904 B1 | * | 5/2004 | Butaud et al. .............. 327/298 |
| 6,888,412 B1 | * | 5/2005 | Kim et al. .................. 311/1 A |
| 6,970,680 B1 | * | 11/2005 | Tomoe ...................... 455/63.3 |
| 2002/0176385 A1 | | 11/2002 | Huh et al. |
| 2003/0118080 A1 | * | 6/2003 | Hailey ........................ 375/130 |
| 2005/0105590 A1 | * | 5/2005 | Egan et al. ................. 375/130 |

FOREIGN PATENT DOCUMENTS

| EP | 1 152 254 | 11/2001 |
| WO | WO 98/58509 | 12/1998 |
| WO | WO 02/056247 | 7/2002 |

* cited by examiner

*Primary Examiner*—Simon Nguyen
(74) *Attorney, Agent, or Firm*—Oblon, Spivak, McClelland, Maier & Neustadt, P.C.

(57) ABSTRACT

In a communication terminal that is capable of carrying out communications based on a plurality of communication standards, for example, a cellular phone, information representing a reception carrier frequency of a wireless channel being received by a cellular-phone functional block is output from a CPU to a contactless-IC-card-reader/writer functional block. In the contactless-IC-card-reader/writer functional block, a controller controls a switching circuit to switch a transmission carrier frequency being used so that harmonic components of an electromagnetic wave radiated from a coil antenna will not work as an electromagnetic-interference wave that affects reception sensitivity of the cellular-phone functional block.

17 Claims, 8 Drawing Sheets

FIG. 3

| OSCILLATOR 62 (f1) = 13.56MHz ±500ppm | | PDC CELLULAR-PHONE RECEPTION CARRIERS WITHIN FREQUENCY OF HARMONIC WAVE ASSOCIATED WITH OSCILLATOR 62 (f1) ±100kHz | |
|---|---|---|---|
| HARMONIC ORDER | FREQUENCY RANGE | WIRELESS CHANNELS | RECEPTION CARRIER FREQUENCIES |
| 60 | 813.193~814.007MHz | 124~164 | 813.10~814.10MHz |
| 61 | 826.746~827.574MHz | 666~706 | 826.65~827.65MHz |
| OSCILLATOR 63 (f2) = 13.585MHz ±500ppm | | PDC CELLULAR-PHONE RECEPTION CARRIERS WITHIN FREQUENCY OF HARMONIC WAVE ASSOCIATED WITH OSCILLATOR 63 (f2) ±100kHz | |
| HARMONIC ORDER | FREQUENCY RANGE | WIRELESS CHANNELS | RECEPTION CARRIER FREQUENCIES |
| 60 | 814.692~815.508MHz | 184~224 | 814.60~815.60MHz |
| 61 | 828.271~829.099MHz | NONE | NONE |

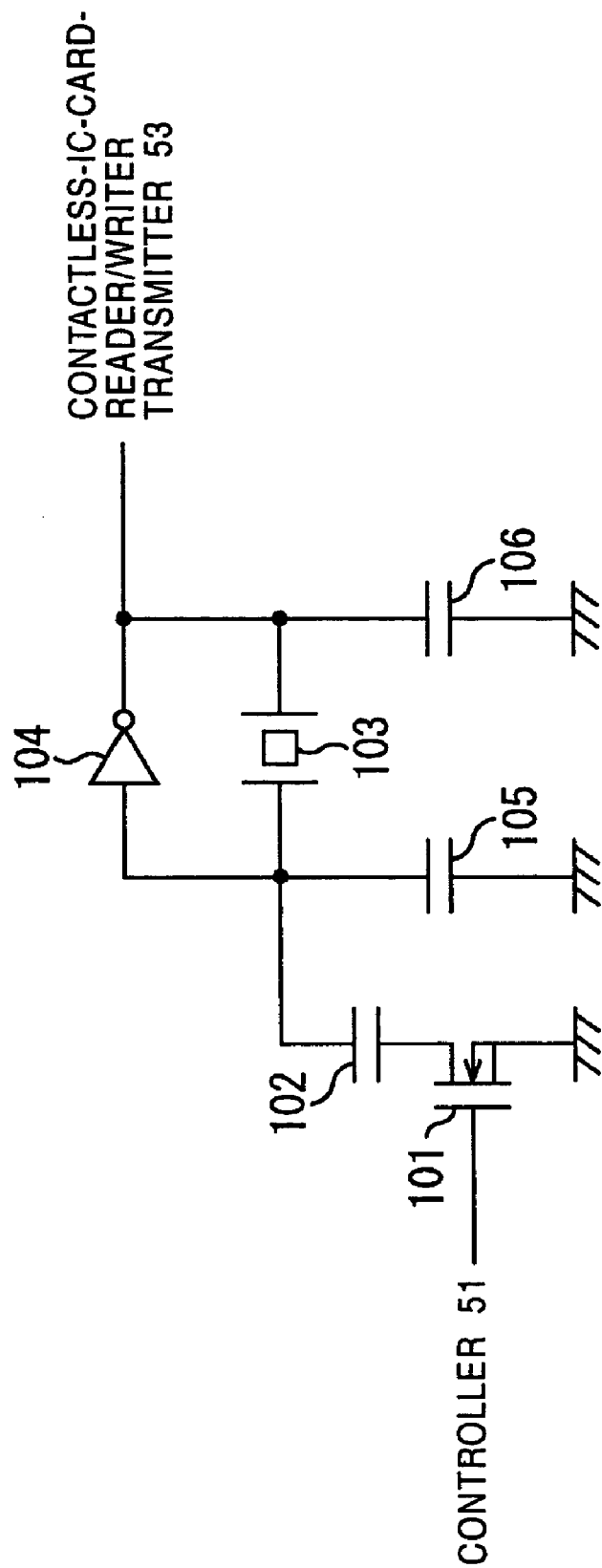

WIRELESS COMMUNICATION CIRCUIT, WIRELESS COMMUNICATION TERMINAL AND METHOD, RECORDING MEDIUM, AND PROGRAM

BACKGROUND OF THE INVENTION

1. Field of the Invention

The present invention relates to wireless communication circuits, wireless communication terminals and methods, recording media, and programs. Particularly, the present invention relates to a wireless communication circuit, a wireless communication terminal and method, a recording medium, and a program that serve to achieve a more favorable reception sensitivity even when a plurality of wireless communication functions is being used simultaneously.

2. Description of the Related Art

Recently, systems for managing commutation-ticket information or electronic-money information using contactless IC cards are becoming more widely used. For example, a user is allowed to pass a ticket gate only by placing a contactless IC card storing commutation-ticket information thereon in proximity to a ticket checking machine, or to pay a price of a product in terms of electronic money only by placing a contactless IC card storing electronic-money information thereon in proximity to a reader/writer.

A cellular phone is a device that is constantly carried with by a user thereof. If the cellular phone has the functionality of a contactless IC card or a contactless-IC-card reader/writer as described above, for example, as disclosed in Japanese Unexamined Patent Application Publication No. 11-213111, the user is allowed to pass a ticket gate or to pay a price of a product using the cellular phone as well as carrying out communications such as telephone calls and electronic mails, which is very convenient.

The problem, however, is that if a cellular phone includes a contactless-IC-card reader/writer that carries out communications by electromagnetic induction, an electromagnetic-interference wave generated by the contactless-IC-card reader/writer could degrade the reception sensitivity of the cellular phone (the reception sensitivity to radio waves used for calls or communications by cellular-phone functions).

For example, in the case of communications based on Personal Digital Cellular (PDC) Telecommunication System (ARIB STANDARD RCR STD-27), where communications are carried out in a 800-MHz frequency band using base-station transmission carrier frequencies (cellular-phone reception carrier frequencies) in a range of 810 MHz to 828 MHz, base-station reception carrier frequencies (cellular-phone transmission carrier frequencies) in a range of 940 MHz to 958 MHz, and a transmission/reception carrier-frequency gap of 130 MHz, the reception carrier frequency of a wireless channel of a cellular phone can be expressed by equation (1) below:

$$\text{(Reception carrier frequency of cellular phone)} = 810 + 0.025 \times n \text{ (MHz)} \quad (1)$$

where n is a positive integer.

On the other hand, the frequency of a transmission carrier for transmitting data thereon from a contactless-IC-card reader/writer provided in a cellular phone or the like is generally 13.56 MHz, and an electromagnetic wave having a frequency expressed by equation (2) below is generated as a harmonic component thereof:

$$\text{(Transmission harmonic-frequency of contactless-}IC\text{-card reader/writer)} = 13.56 \times m \text{ (MHz)} \quad (2)$$

where m is a positive integer.

Thus, for example, if m is 60 or 61 in equation (2), the contactless-IC-card reader/writer radiates a transmission harmonic wave having a frequency of 813.6 MHz or 827.16 MHz, respectively, as an electromagnetic-interference wave.

The electromagnetic-interference wave falls within the cellular-phone reception-carrier-frequency band (810 MHz to 828 MHz). Thus, when a wireless channel having a reception carrier frequency in the vicinity of the frequency of the electromagnetic-interference wave is being received by the cellular phone, the electromagnetic-interference wave interferes with communication in the wireless channel, causing degradation in the reception sensitivity.

That is, according to the PDC standard, substantially no selectivity is provided against an interference wave that is detuned by ±25 kHz from the cellular-phone reception carrier frequency, so that a degradation in the reception sensitivity arises in a wireless channel for which an electromagnetic-interference wave exists within ±25 kHz of the cellular-phone carrier frequency.

More specifically, when n=143, 144, 145, 686, and 689 in equation (1), the cellular-phone carrier frequency is 813.575 MHz, 813.6 MHz, 813.625 MHz, 827.15 MHz, and 827.175 MHz, respectively. These frequencies fall within the ranges of (813.6 MHz and 827.16 MHz)±25 kHz, where 813.6 MHz and 827.16 MHz are the frequencies of electromagnetic-interference waves associated with the harmonic orders of 60 and 61. Thus, the reception sensitivity is degraded when wireless channels having these frequencies as reception carrier frequencies thereof are being received.

According to IMT-2000 DS-CDMA System (ARIB STD-T63 Ver. 3.0.0), communications are usually carried out in full duplex with a wireless-signal bandwidth of 3.84 MHz, using base-station transmission carrier frequencies (cellular-phone reception carrier frequencies) in a range of 2,110 MHz to 2,170 MHz, base-station reception carrier frequencies (cellular-phone transmission carrier frequencies) in a range of 1,920 MHz to 1,980 MHz, and a transmission/reception carrier-frequency gap of 190 MHz.

Thus, a cellular-phone reception carrier frequency and a cellular-phone transmission carrier frequency has a relationship expressed in equation (3) below:

$$\text{(Cellular-phone reception carrier frequency)} = \text{(Cellular-phone transmission carrier frequency)} + 190 \text{ (MHz)} \quad (3)$$

When a cellular-phone transmission wave is input to the contactless-IC-card reader/writer, the cellular-phone transmission wave is mixed with a contactless-IC-card-reader writer transmission wave due to non-linearity of devices constituting the contactless-IC-card-reader/writer circuit, generating an electromagnetic-interference wave having a frequency expressed by equation (4) below:

$$\text{(Frequency of } EMI \text{ wave of contactless-}IC\text{-card reader/writer)} = \text{(Cellular-phone transmission carrier frequency)} \pm \text{(Contactless-}IC\text{-card-reader/writer transmission carrier frequency)} \times p \text{ (MHz)} \quad (4)$$

where p is a positive integer.

As described earlier, the transmission carrier frequency of the contactless-IC-card reader/writer is generally 13.56 MHz. Assigning the value and, for example, p=14 into equation (4), the frequency of the contactless-IC-card-reader writer EMI wave can be expressed by equation (5) below:

$$\text{(Frequency of contactless-}IC\text{-card-reader/writer } EMI \text{ wave)} = \text{(Cellular-phone transmission carrier frequency)} + 13.56 \times 14 = \text{(Cellular-phone transmission carrier frequency)} + 189.84 \text{ (MHz)} \quad (5)$$

As described earlier in relation to equation (3), in communications based on IMT-2000 DS-CDMA System, a gap of 190 MHz exists between a reception carrier frequency and a transmission carrier frequency of a cellular phone. As is apparent from equation (5), the reception carrier frequency of the cellular phone falls in the vicinity of the frequency of the EMI wave generated by the contactless-IC-card reader writer. That is, EMI waves exist within the 3.84-MHz wireless-signal bandwidth.

Therefore, when communication by the contactless-IC-card-reader/writer function and communication by the cellular-phone function are being carried out simultaneously, the reception sensitivity is degraded is all the channels that can be received by the cellular phone.

As described above, in a terminal having both a cellular-phone function (PDC or IMT-2000 DS-CDMA System) and a contactless-IC-card reader/writer function, the reception sensitivity to a wireless channel being received by the cellular-phone function could be degraded depending on the operation status of the contactless-IC-card-reader/writer function.

Considering the situation that various wireless communication systems are being standardized and communication functions based on various standards are being mounted on a single terminal such as a cellular phone, the problem could become even more problematic.

SUMMARY OF THE INVENTION

The present invention has been made in view of the situation described above, and an object thereof is to achieve more favorable reception sensitivity even in a case where a plurality of wireless communication functions is being used simultaneously.

The present invention, in one aspect thereof, provides a wireless communication circuit including a receiver for receiving a first electromagnetic wave having a first carrier frequency for communication based on a first wireless communication standard; a transmitter for transmitting a second electromagnetic wave having a second carrier frequency for communication based on a second wireless communication standard; and a controller for controlling the second carrier frequency so that a frequency of an electromagnetic-interference wave that is generated by transmission of the second electromagnetic wave by the transmitter does not fall within a predetermined frequency range with which reception sensitivity of the receiver to the first electromagnetic wave is degraded.

The wireless communication circuit may further include a plurality of generating units for generating respectively different frequencies, wherein the controller controls the second carrier frequency by selecting one of the plurality of generating units.

Alternatively, the wireless communication circuit may further include a generating unit for generating different frequencies in accordance with change in a resonance frequency of an oscillator, wherein the controller controls the second carrier frequency by changing the resonance frequency.

Alternatively, the wireless communication circuit may further include a generating unit for generating different frequencies in accordance with change in a load capacitance of an oscillator, wherein the controller controls the second carrier frequency by changing the load capacitance.

In the wireless communication circuit, the controller may control the second carrier frequency by using a clock used by the receiver or a real-time clock for timekeeping as a reference clock for a phase-locked loop circuit, and setting a frequency-dividing number for the phase-locked loop circuit.

Also, in the wireless communication circuit, the controller may determine that the reception sensitivity to the first electromagnetic wave is degraded by the electromagnetic-interference wave when the first carrier frequency has a value in a vicinity of an integer multiple of the second carrier frequency, and control the second carrier frequency.

Alternatively, in the wireless communication circuit, the controller may determine that the reception sensitivity to the first electromagnetic wave is degraded by the electromagnetic-interference wave when communication based on the first wireless communication standard is being carried out, and control the second carrier frequency.

The present invention, in another aspect thereof, provides a wireless communication terminal including a receiver for receiving a first electromagnetic wave having a first carrier frequency for communication based on a first wireless communication standard; a transmitter for transmitting a second electromagnetic wave having a second carrier frequency for communication based on a second wireless communication standard; and a controller for controlling the second carrier frequency so that a frequency of an electromagnetic-interference wave that is generated by transmission of the second electromagnetic wave by the transmitter does not fall within a predetermined frequency range with which reception sensitivity of the receiver to the first electromagnetic wave is degraded.

The wireless communication terminal may further include a plurality of generating units for generating respectively different frequencies, wherein the controller controls the second carrier frequency by selecting one of the plurality of generating units.

Alternatively, the wireless communication terminal may further include a generating unit for generating different frequencies in accordance with change in a resonance frequency of an oscillator, wherein the controller controls the second carrier frequency by changing the resonance frequency.

Alternatively, the wireless communication terminal may further include a generating unit for generating different frequencies in accordance with change in a load capacitance of an oscillator, wherein the controller controls the second carrier frequency by changing the load capacitance.

In the wireless communication terminal, the controller may control the second carrier frequency by using a clock used by the receiver or a real-time clock for timekeeping as a reference clock for a phase-locked loop circuit, and setting a frequency-dividing number for the phase-locked loop circuit.

Also, in the wireless communication terminal, the controller may determine that the reception sensitivity to the first electromagnetic wave is degraded by the electromagnetic-interference wave when the first carrier frequency has a value in a vicinity of an integer multiple of the second carrier frequency, and control the second carrier frequency.

Alternatively, in the wireless communication terminal, the controller may determine that the reception sensitivity to the first electromagnetic wave is degraded by the electromagnetic-interference wave when communication based on the first wireless communication standard is being carried out, and control the second carrier frequency.

The present invention, in another aspect thereof, provides a wireless communication method including a receiving step of receiving a first electromagnetic wave having a first carrier frequency for communication based on a first wireless communication standard; a transmitting step of transmitting a second electromagnetic wave having a second carrier frequency for communication based on a second wireless communication standard; and a controlling step of controlling the second carrier frequency so that a frequency of an electromagnetic-interference wave that is generated by transmission of the second electromagnetic wave in the transmitting step does not fall within a predetermined frequency range with which reception sensitivity to the first electromagnetic wave in the reception step is degraded.

The present invention, in another aspect thereof, provides a recording medium having recorded thereon a computer-readable program that allows a computer to execute processing for receiving a first electromagnetic wave having a first carrier frequency for communication based on a first wireless communication standard, and processing for transmitting a second electromagnetic wave having a second carrier frequency for communication based on a second wireless communication standard, the program including a controlling step of controlling the second carrier frequency so that a frequency of an electromagnetic-interference wave that is generated by transmission of the second electromagnetic wave does not fall within a predetermined frequency range with which reception sensitivity to the first electromagnetic wave is degraded.

The present invention, in another aspect thereof, provides a computer-readable program that allows a computer to execute processing for receiving a first electromagnetic wave having a first carrier frequency for communication based on a first wireless communication standard, and processing for transmitting a second electromagnetic wave having a second carrier frequency for communication based on a second wireless communication standard, the program including a controlling step of controlling the second carrier frequency so that a frequency of an electromagnetic-interference wave that is generated by transmission of the second electromagnetic wave does not fall within a predetermined frequency range with which reception sensitivity to the first electromagnetic wave is degraded.

According to the wireless communication circuit, wireless communication terminal and method, recording medium, and program, a first electromagnetic wave having a first carrier frequency for communication based on a first wireless communication standard is received, and a second electromagnetic wave having a second carrier frequency for communication based on a second wireless communication standard is transmitted. The second carrier frequency is controlled so that the frequency of an electromagnetic-interference wave that is generated together with the second electromagnetic wave does not fall within a predetermined frequency range with which reception sensitivity to the first electromagnetic wave is degraded.

According to the present invention, improved reception sensitivity can be achieved even when a plurality of wireless communication functions is being used simultaneously.

BRIEF DESCRIPTION OF THE DRAWINGS

FIG. 3 is a diagram for explaining switching of a transmission carrier frequency;

FIG. 8 is a diagram showing an example of a transmission-carrier generating circuit.

DESCRIPTION OF THE PREFERRED EMBODIMENTS

Figure 1:
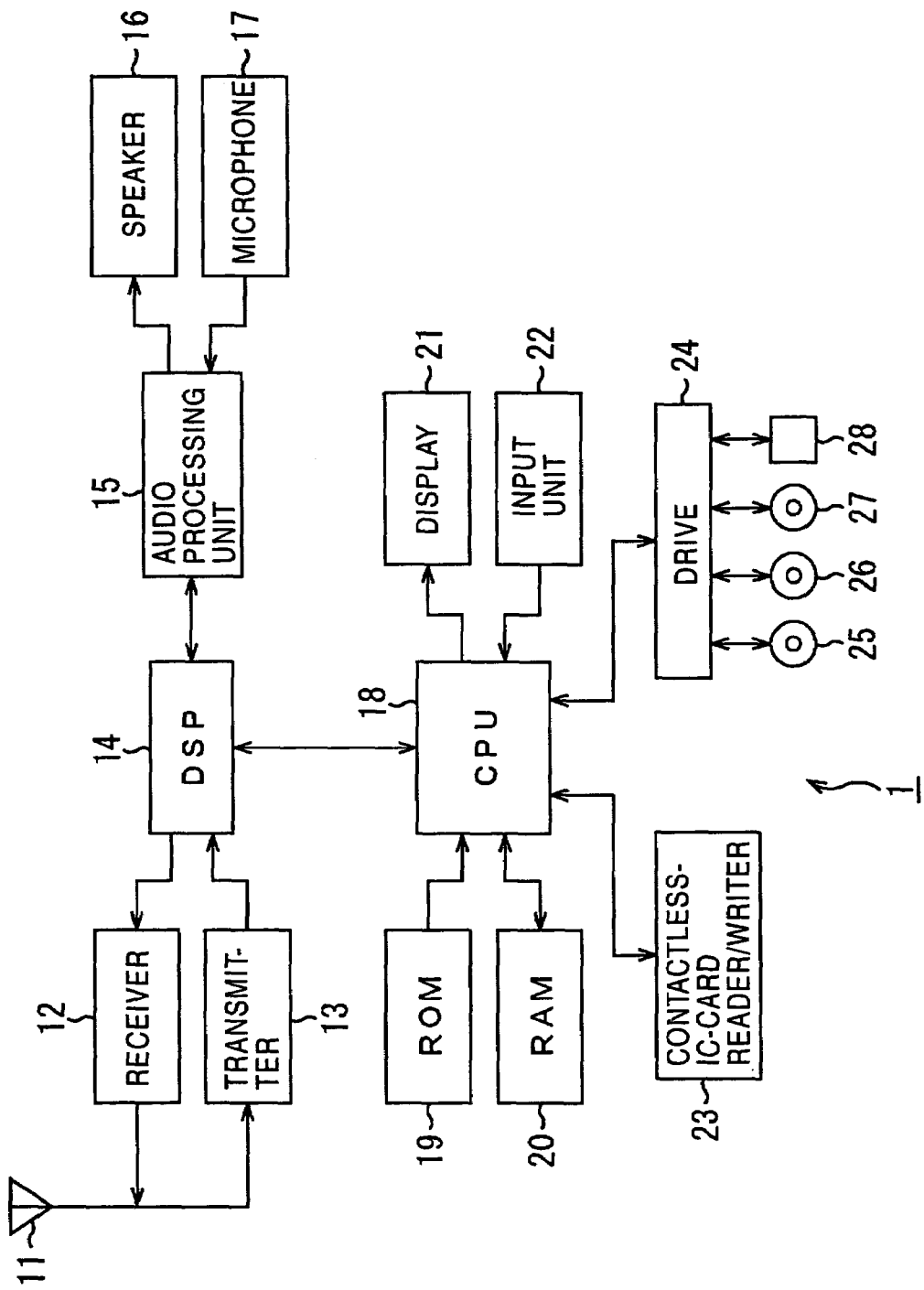
FIG. 1 is a block diagram showing an example configuration of a cellular phone according to the present invention.

FIG. 1 is a block diagram showing an example configuration of a cellular phone 1 according to the present invention.

Referring to FIG. 1, a central processing unit (CPU) 18 loads a control program stored in a read-only memory (ROM) 19 into a random access memory (RAM) 20, and controls the overall operation of the cellular phone 1 according to the control program.

For example, the CPU 18 controls a digital signal processor (DSP) 14 according to commands issued by a user, exchanging various information such as audio information with base stations. Also, the CPU 18 controls a contactless-IC-card reader/writer 23, carrying out short-range wireless communications by electromagnetic induction with a device placed in proximity, such as a contactless IC card.

As will be described later in detail, the CPU 18, when simultaneously carrying out communications by a transmitter 12 and a receiver 13 and communications by the contactless-IC-card reader/writer 23, switches the frequency of a carrier that is used by the contactless-IC-card reader/writer 23 so that the reception sensitivity of the receiver 13 to an electromagnetic wave (radio wave) will not be degraded by an electromagnetic-interference (EMI) wave generated by the contactless-IC-card reader/writer 23.

The transmitter 12 and the receiver 13 carry out communications based on, for example, Personal Digital Cellular (PDC) Telecommunication System or IMT-2000 DS-CDMA System.

The transmitter 12, upon receiving audio information from the DSP 14, executes predetermined processes such as digital-to-analog conversion and frequency conversion, and sends a resulting audio signal from an antenna 11 on a wireless channel having a transmission carrier frequency selected by a base station.

The receiver 13, for example, in speech communication mode, amplifies an RF signal received by the antenna 11, executes predetermined processes such as frequency conversion and analog-to-digital conversion, and outputs resulting audio information to the DSP 14.

The DSP 14, for example, executes spectrum despreading on the audio information supplied from the receiver 13, and outputs resulting data to an audio processing unit 15. Also, the DSP 14 executes spectrum spreading on audio information supplied from the audio processing unit 15, and outputs resulting data to the transmitter 12.

The audio processing unit 15 converts a speech uttered by a user and collected by a microphone 17 into audio information, and outputs the audio information to the DSP 14. Also, the DSP 14 converts audio information supplied from the DSP 14 into an analog audio signal, and outputs a corresponding audio signal via a speaker 16.

A display 21 is implemented, for example, by a liquid crystal display (LCD), and it displays a screen corresponding to information supplied from the CPU 18. An input unit 22 detects inputs entered by the user via numeric keys, a call button, a power button, and other buttons provided on a surface of the case of the cellular phone 1, and outputs corresponding signals to the CPU 18.

The contactless-IC-card reader/writer 23, under the control of the CPU 18, exchanges various information with a device placed in proximity thereto, such as a contactless IC card, based on change in load in relation to an electromagnetic wave radiated from a coil antenna 54 (FIG. 3).

For example, the contactless-IC-card reader/writer 23, when sending a command to a contactless IC card placed in proximity thereto, executes BPSK (binary phase shift keying) modulation (coding into Manchester code) on the command. Based on the resulting data, the contactless-IC-card reader/writer 23 ASK (amplitude shift keying) modulates a carrier wave having a particular frequency, supplied from an oscillator, and outputs a resulting modulated wave from the coil antenna 54 in the form of an electromagnetic wave.

On the other hand, the contactless-IC-card reader/writer 23, upon receiving response data (ASK-modulated wave) from the contactless IC card via the coil antenna 54, demodulates the response data, and further executes BPSK demodulation (decoding of Manchester code) on the data demodulated, thereby obtaining data in a demodulated form.

As needed, a drive 24 is connected to the CPU 18, on which a magnetic disk 25, an optical disk 26, a magneto-optical disk 27, a semiconductor memory 28, or the like is mounted as needed, and a computer program read therefrom is installed on a storage device that is not shown, such as a flash memory.

Figure 2:
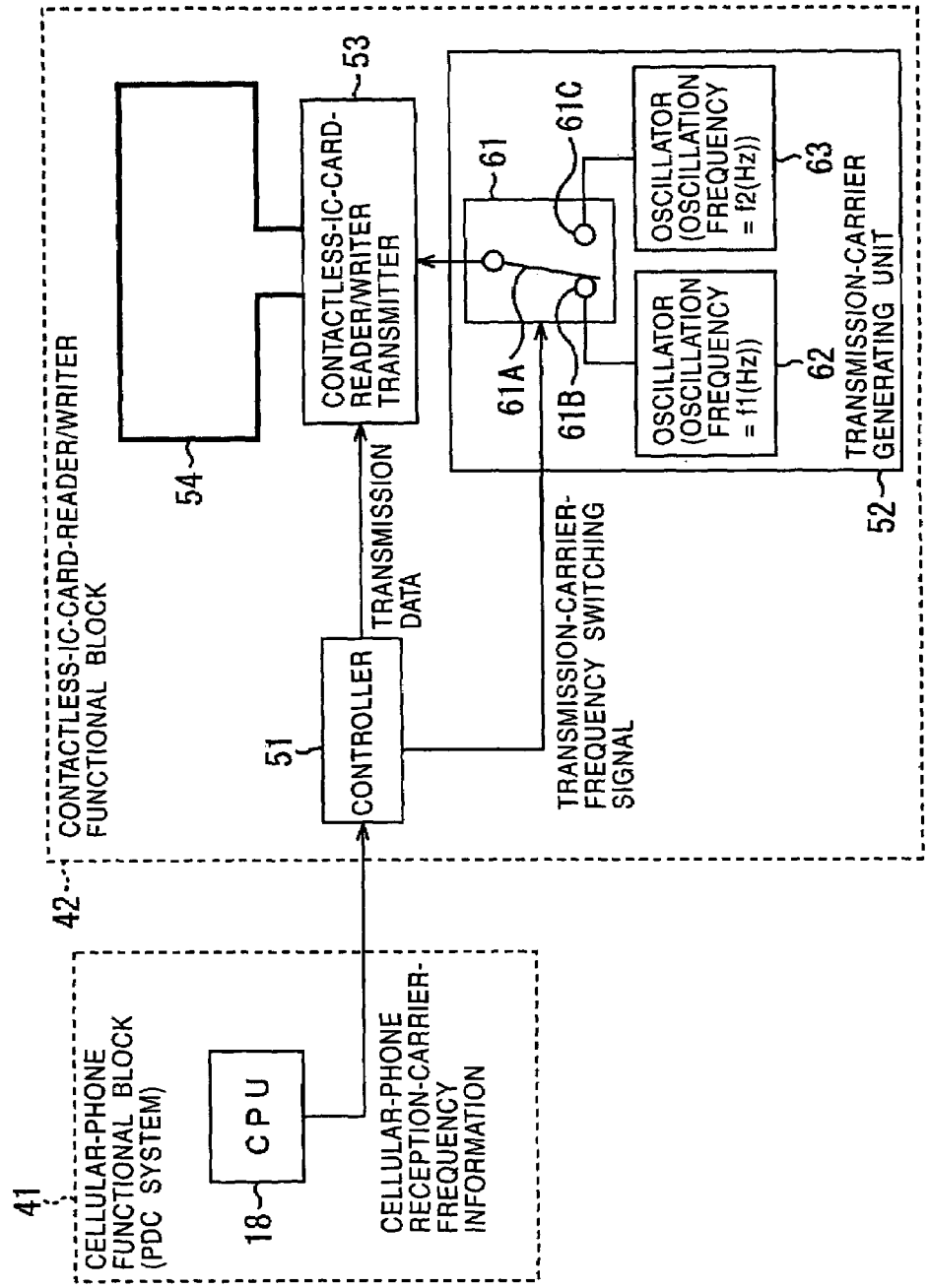
FIG. 2 is a diagram showing an example functional configuration of the cellular phone shown in FIG. 1.

FIG. 2 is a diagram showing an example functional configuration of the cellular phone 1.

Referring to FIG. 2, the cellular phone 1 basically includes a cellular-phone functional block 41 having the functions of the components shown in FIG. 1 other than the contactless-IC-card reader/writer 23, and a contactless-IC-card-reader/writer functional block 42 having functions of the contactless-IC-card reader/writer 23 shown in FIG. 1.

In the example shown in FIG. 2, the cellular-phone functional block 41 is a block for exchanging various information with base stations based on the PDC Telecommunication System (ARIB STANDARD RCR STD-27). For example, the cellular-phone functional block 41 carries out communications using base-station transmission carrier frequencies (cellular-phone reception carrier frequencies) in a range of 810 MHz to 828 MHz, base-station reception carrier frequencies (cellular-phone transmission carrier frequencies) in a range of 940 MHz to 958 MHz, with a transmission/reception carrier-frequency gap of 130 MHz. The cellular-phone reception carrier frequencies are defined in steps of 25 kHz, and are assigned by base stations.

The CPU 18 obtains a reception carrier frequency of a wireless channel being received by the receiver 13, and outputs cellular-phone reception-carrier-frequency information representing the reception carrier frequency to a controller 51 of the contactless-IC-card-reader/writer functional block 42.

The controller 51 outputs transmission data to be transmitted to an external contactless IC card or the like to a contactless-IC-card-reader/writer transmitter 53, and outputs a transmission-carrier-frequency switching signal to a transmission-carrier generating unit 52 based on the cellular-phone reception-carrier-frequency information supplied from the CPU 18.

The transmission-carrier generating unit 52 controls a switching circuit 61 based on the transmission-carrier-frequency switching signal supplied from the controller 51, thereby switching the frequency of a transmission carrier supplied to the contactless-IC-card-reader/writer transmitter 53.

The switching circuit 61 receives, for example, a transmission carrier having a frequency of 13.56 MHz±500 ppm (f1) from an oscillator 62, and a transmission carrier having a frequency of 13.585 MHz±500 ppm (f2) from an oscillator 63.

The contactless-IC-card-reader/writer transmitter 53, based on the transmission data supplied from the controller 51, executes ASK modulation on the transmission-carrier signal supplied from the transmission-carrier generating unit 52 via the switching circuit 61, and outputs a resulting signal to the coil antenna 54.

FIG. 3 is a diagram for explaining switching of oscillators.

FIG. 3 shows harmonic orders that cause harmonic waves in the range of the cellular-phone reception carrier frequency of 810 MHz to 828 MHz, higher-harmonic frequency ranges calculated according to equation (6) below based on the harmonic orders and the frequencies of the oscillators, and the channel numbers of PDC wireless channels that fall in a range of the relevant frequency range±100 kHz, each for a case where the oscillator 62 is selected and for a case where the oscillator 63 is selected.

$$\text{(Transmission harmonic frequency of contactless-IC-card reader/writer)}=\text{(Frequency of oscillator)}\times m \text{ (MHz)} \quad (6)$$

where m is a positive integer.

More specifically, FIG. 3 shows that the frequency range of harmonic waves generated by the oscillator 62 (13.56 MHz±500 ppm) is 813.193 MHz to 814.007 MHz when the harmonic order is 60 and is 826.746 MHz to 827.574 MHz when the harmonic order is 61.

FIG. 3 also shows that the frequency range of harmonic waves generated by the oscillator 63 (13.585 MHz±500 ppm) is 814.692 MHz to 815.508 MHz when the harmonic order is 60 and is 828.271 MHz to 829.099 MHz when the harmonic order is 61.

Furthermore, regarding the case where the oscillator 62 is selected, FIG. 3 shows that PDC wireless channels having channel numbers of 124 to 164 (having reception carrier frequencies of 813.10 MHz to 814.10 MHz) exist in a frequency range of (813.193 MHz to 814.007 MHz)±100 kHz, where 813.193 MHz to 814.007 MHz is the frequency range of harmonic waves associated with the harmonic order of 60, and that wireless channels having channel numbers of 666 to 706 (having reception carrier frequencies of 826.65 MHz to 827.65 MHz) exist in a frequency range of (826.746 MHz to 827.574 MHz)±100 KHz, where 826.746 MHz to 827.574 MHz is the frequency range of harmonic waves associated with the harmonic order of 61.

Furthermore, regarding the case where the oscillator 63 is selected, FIG. 3 shows that PDC wireless channels having channel numbers of 184 to 224 (having reception carrier frequencies of 814.60 MHz to 815.60 MHz) exist in a frequency range of (814.692 MHz to 815.508 MHz)±100 KHz, where 814.692 MHz to 815.508 MHz is the frequency range of harmonic waves associated with the harmonic order of 60, and that wireless channels do not exist in a frequency range (828.271 MHz to 829.099 MHz)±100 KHz, where 828.271 MHz to 829.099 MHz is the frequency range of harmonic waves associated with the harmonic order of 61.

In this example, wireless channels in a range of the frequency range of associated harmonic waves+100 kHz are being considered since the PDC standard (RCR STD-27, Edition I, Vol. 1, 3.4.3.4, "Adjacent Channel Selectivity") dictates a selectivity on the order of 57 dB or higher with a detuning of 100 kHz. That is, attenuation on the order of 57 dB or larger can be expected with a detuning of 100 kHz, so that the sensitivity of the cellular-phone functional block 41 to a reception carrier will not be degraded by an electromagnetic-interference wave having a frequency that is detuned by 100 kHz or larger.

Thus, when a wireless channel in the frequency range of 813.10 MHz to 814.10 MHz or 826.65 MHz to 827.65 MHz (in the vicinity of the frequency range of harmonic waves generated by the oscillator 62) is being received by the cellular-phone functional block 41, a switch 61A is connected to a terminal 61C, whereby a transmission carrier supplied from the oscillator 63 is selected as a transmission carrier for the contactless-IC-card reader/writer 23.

On the other hand, when a wireless channel having a reception frequency carrier that does not fall in the above range is being received, the switch 61A is connected to a terminal 61B, whereby a transmission carrier supplied from the oscillator 62 is selected.

Thus, a wireless channel received by the cellular-phone functional block 41 becomes less susceptible to an electromagnetic-interference wave generated by the contactless-IC-card reader/writer 23, serving to avoid degradation in the reception sensitivity to the wireless channel.

For example, if data is transmitted from the contactless-IC-card reader/writer 23 using a transmission carrier supplied from the oscillator 62 although a wireless channel having a reception carrier frequency that falls in the range of 813.10 MHz to 814.10 MHz is being received by the cellular-phone functional block 41, harmonic components of the transmission carrier work as electromagnetic-interference waves, causing a degradation in the reception sensitivity to the wireless channel. Such degradation in the reception sensitivity can be avoided by switching between the oscillators as described above.

Next, a process for switching a transmission-carrier frequency in the contactless-IC-card-reader/writer functional block 42, executed by the cellular phone 1, will be described with reference to a flowchart shown in FIG. 4.

The arrangement may be such that this process is executed repeatedly only when the contactless-IC-card-reader/writer functional block 42 is active. This reduces the processing load of the CPU 18 compared with a case where the process shown in FIG. 4 is repeated constantly.

In step S1, based on an output from the receiver 13, the CPU 18 obtains the reception carrier frequency of a wireless channel being received by the receiver 13. Then, in step S2, the CPU 18 outputs cellular-phone reception-carrier-frequency information representing the reception carrier frequency to the controller 51 of the contactless-IC-card-reader/writer functional block 42.

In step S3, based on the cellular-phone reception-carrier-frequency information supplied from the CPU 18, the controller 51 determines whether the reception carrier frequency of the wireless channel being received by the receiver 13 falls within the range of 813.10 MHz to 814.10 MHz or 826.65 to 827.65 MHz (i.e., in the vicinity of the frequency range of harmonic waves generated by the oscillator 62). If it is determined that the reception carrier frequency does not fall within these ranges, the procedure proceeds to step S4.

In step S4, the controller 51 selects a transmission carrier supplied from the oscillator 62, and outputs to the switching circuit 61 a transmission-carrier-frequency switching signal that causes the switch 61A to be connected to the terminal 61B.

Thus, the transmission carrier from the oscillator 62 is supplied to the contactless-IC-card-reader/writer transmitter 53 via the switching circuit 61.

In the contactless-IC-card-reader/writer transmitter 53, the transmission carrier signal having a frequency of 13.56 MHz±500 ppm, supplied from the oscillator 62, is ASK-modulated based on transmission data supplied from the controller 51, and a resulting signal is output from the coil antenna 54.

On the other hand, if it is determined in step S3 that the reception carrier frequency of the wireless channel being received falls within the range of 813.10 MHz to 814.10 MHz or 826.65 MHz to 827.65 MHz (i.e., in the vicinity of the frequency range of harmonic waves generated by the oscillator 62), the procedure proceeds to step S5, in which the controller 51 selects a transmission carrier supplied from the oscillator 63.

That is, the controller 51 outputs a transmission-carrier-frequency switching signal that causes the switch 61A to be connected to the terminal 61C, whereby the transmission carrier from the oscillator 63 is supplied to the contactless-IC-card-reader/writer transmitter 53 via the switching circuit 61.

In the contactless-IC-card-reader/writer transmitter 53, the transmission-carrier-frequency signal having a frequency of 13.585±500 ppm, supplied from the oscillator 63, is ASK-modulated based on transmission data supplied from the controller 51, and a resulting signal is output from the coil antenna 54.

As described above, a plurality of oscillators that generate transmission carriers having mutually different frequencies is provided, and the transmission carriers are switched between in accordance with the reception carrier frequency of a wireless channel being received by the cellular-phone functional block 41. Accordingly, harmonic components generated in the contactless-IC-card-reader/writer functional block 42 are prevented from working as electromagnetic-interference waves, serving to avoid degradation in the reception sensitivity to the wireless channel.

Figure 5:
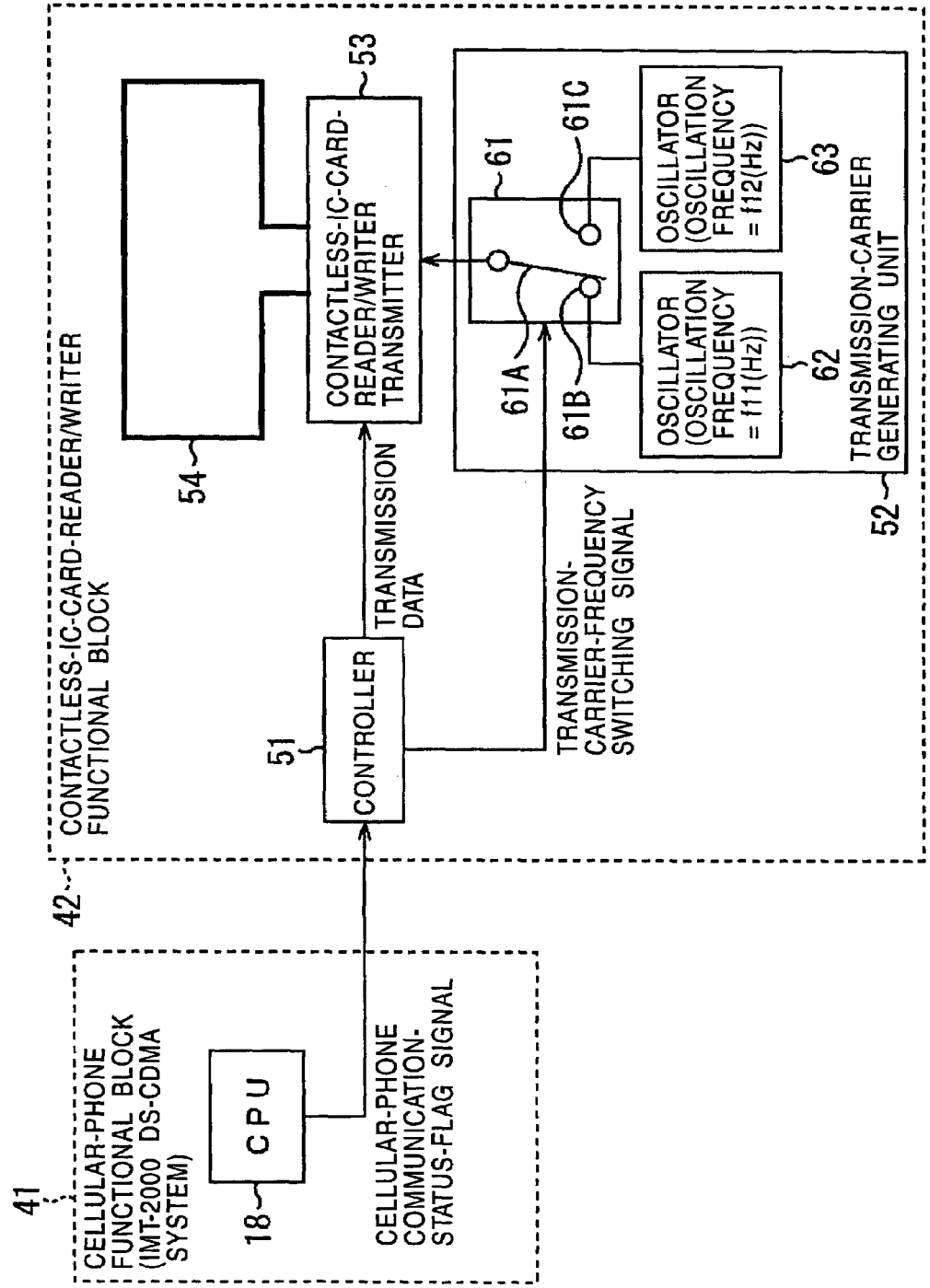
FIG. 5 is a diagram showing another example functional configuration of the cellular phone shown in FIG. 1.

FIG. 5 is a diagram showing another example functional configuration of the cellular phone 1. The configuration shown in FIG. 5 is substantially the same as the configuration shown in FIG. 2, so that detailed descriptions thereof will be omitted as appropriate.

Referring to FIG. 5, the cellular-phone functional block 41 allows exchanging various information with base stations based on IMT-2000 DS-CDMA System. The communications are usually carried out in full duplex with a bandwidth of 3.84 MHz, using base-station transmission carrier frequencies (cellular-phone reception carrier frequencies) in a range of 2,110 MHz to 2,170 MHz, base-station reception carrier frequencies (cellular-phone transmission carrier frequencies) in a range of 1,920 MHz to 1,980 MHz, and a transmission/reception carrier-frequency gap of 190 MHz.

The CPU 18 monitors the operations of the transmitter 12 and the receiver 13, and outputs a cellular-phone communication-status-flag signal indicating whether communication based on IMT-2000 DS-CDMA System is being carried out to the controller 51 of the contactless-IC-card-reader/writer functional block 42.

The controller 51 outputs transmission data to be transmitted to an external contactless IC card or the like to the contactless-IC-card-reader/writer transmitter 53, and also outputs a transmission-carrier-frequency switching signal to the switching circuit 61 of the transmission-carrier generating unit 52 based on the cellular-phone communication-status-flag signal supplied from the CPU 18.

The transmission-carrier generating unit 52 controls the switching circuit 61 based on the transmission-carrier-frequency switching signal supplied from the controller 51, thereby switching the frequency of a transmission carrier supplied to the contactless-IC-card-reader/writer transmitter 53.

The switching circuit 61 receives, for example, a transmission carrier having a frequency of 13.56 MHz±500 ppm (f11) from the oscillator 62, and a transmission carrier having a frequency of 13.94 MHz±500 ppm (f12) from the oscillator 63.

The contactless-IC-card-reader/writer transmitter 53, based on the transmission data supplied from the controller 51, ASK-modulates the transmission-carrier signal supplied from the transmission-carrier generating unit 52, and outputs a resulting signal from the coil antenna 54.

Now, switching of the switching circuit 61 will be described.

As described earlier, in communications based on IMT-2000 DS-CDMA System, the transmission/reception carrier-frequency gap is 190 MHz, so that a cellular-phone reception carrier frequency and a cellular-phone transmission carrier frequency have a relationship expressed in equation (7) below:

$$\text{(Cellular-phone reception carrier frequency)}=\text{(Cellular-phone transmission carrier frequency)}+190 \text{ (MHz)} \quad (7)$$

The frequency of an electromagnetic-interference wave that is generated in the contactless-IC-card reader/writer 23 due to non-linearity of the devices when a cellular-phone transmission wave is input can be expressed by equation (8) below:

$$\text{(Frequency of } EMI \text{ wave of contactless-}IC\text{-card reader/writer)}=\text{(Cellular-phone transmission carrier frequency)}\pm\text{(Contactless-}IC\text{-card-reader/writer transmission carrier frequency)}\times p\text{(MHz)} \quad (8)$$

where p is a positive integer.

Referring to FIG. 5, the contactless-IC-cardreader/writer transmission carrier supplied from the oscillator 62 has a frequency of 13.56 MHz±500 ppm (f11), and the contactless-IC-card-reader/writer transmission carrier supplied from the oscillator 63 has a frequency of 13.94 MHz±500 ppm (f12). Thus, assigning these values and, for example, p=14 into equation (8), the frequencies of contactless-IC-card-reader/writer EMI waves generated in cases where the respective oscillators are selected can be expressed by equations (9) and (10).

When the transmission carrier supplied from the oscillator 62 (13.56 MHz±500 ppm) is selected, the frequency of contactless-IC-card-reader/writer EMI wave can be expressed as follows:

$$\text{(Frequency of contactless-IC-card-reader/writer } EMI \text{ wave)}=\text{(Cellular-phone transmission carrier frequency)}+(13.56 \text{ MHz}\pm500 \text{ ppm})\times14=\text{(Cellular-phone transmission carrier frequency}+189.745)\text{(MHz) to (Cellular-phone transmission carrier frequency}+189.935)\text{(MHz)} \quad (9)$$

When the transmission carrier supplied from the oscillator 63 (13.94 MHz+500 ppm) is selected, the frequency of contactless-IC-card-reader/writer EMI wave can be expressed as follows:

$$\text{(Frequency of contactless-}IC\text{-card-reader/writer } EMI \text{ wave)}=\text{(Cellular-phone transmission carrier frequency)}+(13.94 \text{ } MHz\pm500 \text{ } ppm)\times14=\text{(Cellular-phone transmission carrier frequency}+195.062)\text{(MHz) to (Cellular-phone transmission carrier frequency}+195.258)\text{(MHz)} \quad (10)$$

From equations (3) and (9), when communication based on IMT-2000 DS-CDMA System is being carried out, the frequency of contactless-IC-card-reader/writer EMI wave falls in the vicinity of the cellular-phone reception carrier frequency. Therefore, if it is determined based on an output from the CPU 18 that the cellular-phone functional block 41 is carrying out communication, the controller 51 controls the switching circuit 61 so that the transmission carrier from the oscillator 63 will be supplied to the contactless-IC-card-reader/writer transmitter 53.

Thus, the EMI wave generated in the contactless-IC-card reader/writer 23 is prevented from affecting the reception sensitivity of a wireless channel being used in the cellular-phone functional block 41.

More specifically, as is apparent from equations (3) and (10), in the case where the oscillator 63 is selected, a difference of 5 MHz or larger exists between the reception carrier frequency of the wireless channel and the frequency of the contactless-IC-card EMI wave. "ARIB STD-T63-25.101 Ver. 3.10.0, 7.5, Adjacent Channel Selectivity (ACS)", which is one of the standards for IMT-2000 DS-CDMA System, dictates 33 dB as a selectivity against an interference wave that is detuned by 5 MHz. Thus, when communication based on IMT-2000 DS-CDMA is being carried out, by selecting the transmission carrier supplied from the oscillator 63 in the contactless-IC-card-reader/writer functional block 42, an improvement on the order of 33 dB or larger in the reception sensitivity can be expected compared with a case where the transmission carrier supplied from the oscillator 62 is selected.

Thus, the controller 51 controls the switching circuit 61 so that the transmission carrier from the oscillator 63 will be supplied to the contactless-IC-card-reader/writer transmitter 53 when it is determined that the cellular-phone functional block 41 is carrying out communication, while controlling the switching circuit 61 so that the transmission carrier from the oscillator 62 will be supplied to the contactless-IC-card-reader/writer transmitter 53 when it is determined that the cellular-phone functional block 41 is not carrying out communication.

Next, the process for switching a transmission carrier frequency, executed by the cellular phone 1 shown in FIG. 5, will be described with reference to a flowchart shown in FIG. 6.

Figure 4:
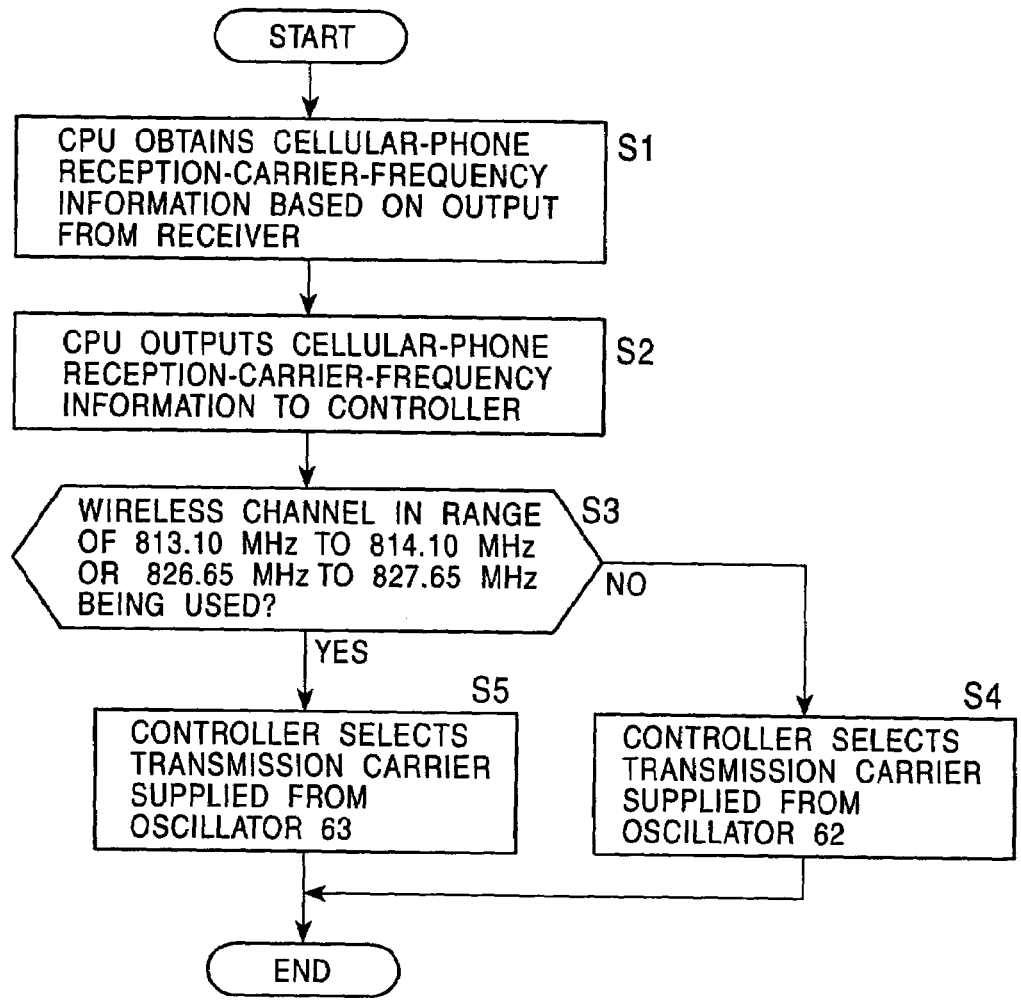
FIG. 4 is a flowchart showing a frequency switching process executed by the cellular phone shown in FIG. 2.
Figure 6:
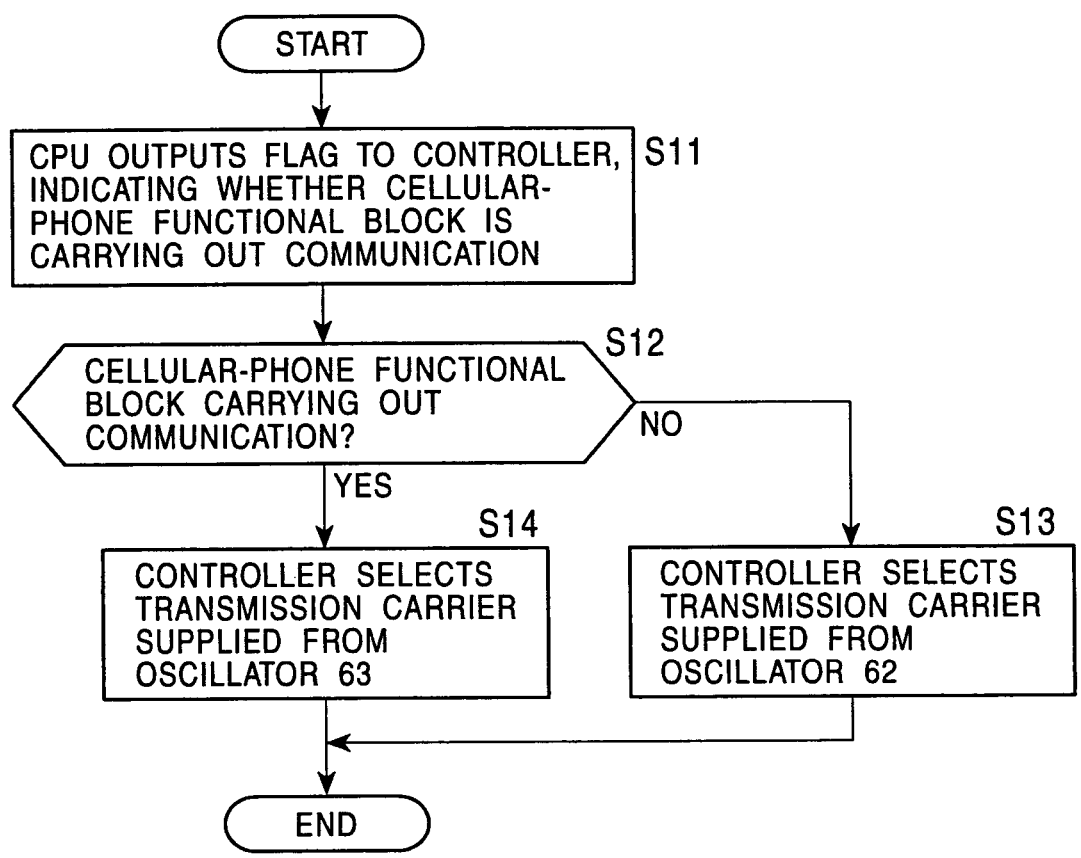
FIG. 6 is a flowchart showing a frequency switching process executed by the cellular phone shown in FIG. 5.

Similarly to the process shown in FIG. 4, the arrangement may be such that the process shown in FIG. 6 is repeatedly executed only when the contactless-IC-card-reader/writer functional block 42 is active.

In step S11, the CPU 18 monitors the operations of the transmitter 12 and the receiver 13, and outputs a cellular-phone communication-status-flag signal indicating whether communication is being carried out by the cellular-phone functional block 41 to the controller 51 of the contactless-IC-card-reader/writer functional block 42.

In step S12, based on the cellular-phone communication-status-flag signal supplied from the CPU 18, the controller 51 determines whether communication is being carried out by the cellular-phone functional block 41. If it is determined that communication is not being carried out, the procedure proceeds to step S13.

In step S13, the controller 51 outputs to the switching circuit 61 a transmission-carrier-frequency switching signal that causes the switch 61A to be connected to the terminal 61B, whereby the transmission carrier from the oscillator 62 is supplied to the contactless-IC-card-reader/writer transmitter 53.

When the contactless-IC-card-reader/writer functional block 42 outputs data, the contactless-IC-card-reader/writer transmitter 53, based on transmission data supplied from the controller 51, ASK-modulates the transmission carrier having a frequency of 13.56 MHz±500 ppm, supplied from the oscillator 62 via the switching circuit 61, and outputs resulting signal from the coil antenna 54.

On the other hand, if it is determined in step S12 that communication is being carried out by the cellular-phone functional block 41, the procedure proceeds to step S14, in which the controller 51 outputs to the switching circuit 61 a transmission-carrier-frequency switching signal that causes the switch 61A to be connected to the terminal 61C.

Thus, the transmission carrier from the oscillator 63 is supplied to the contactless-IC-card-reader/writer transmitter 53.

The contactless-IC-card-reader/writer transmitter 53, based on transmission data supplied from the controller 51, ASK-modulates the transmission carrier signal having a frequency of 13.94 MHz±500 ppm, supplied from the oscillator 65, and outputs a resulting signal from the coil antenna 54.

As described above, a plurality of oscillators that generate transmission carriers having mutually different frequencies is provided, and the transmission carriers are switched between in accordance with whether communication is being carried out by the cellular-phone functional block 41. Accordingly, the EMI wave generated in the contactless-IC-card-reader/writer functional block 42 is prevented from degrading the reception sensitivity of a wireless channel.

Generally, in short-range communications based on electromagnetic inductance, a transmission carrier having a frequency of 13.56 MHz is used. When a transmission carrier having a different frequency (e.g., a transmission carrier having a frequency of 13.94 MHz±500 ppm, supplied from the oscillator 63) is used, an effective communication range between the contactless-IC-card reader/writer 23 and a contactless IC card could become shorter. By using a transmission carrier having a frequency of 13.56 MHz (the transmission carrier from the oscillator 62) when the cellular-phone functional block 41 is not carrying out communication, a period in which the effective communication range between the contactless-IC-card reader/writer and a contactless IC card becomes shorter is minimized.

In the embodiments described above, a plurality of oscillators is provided in the transmission-carrier generating unit 52, and the oscillators are switched between in accordance with the status of the cellular-phone functional block 41 to control a transmission carrier frequency. However, the transmission carrier frequency may be controlled by various other arrangements.

Figure 7:
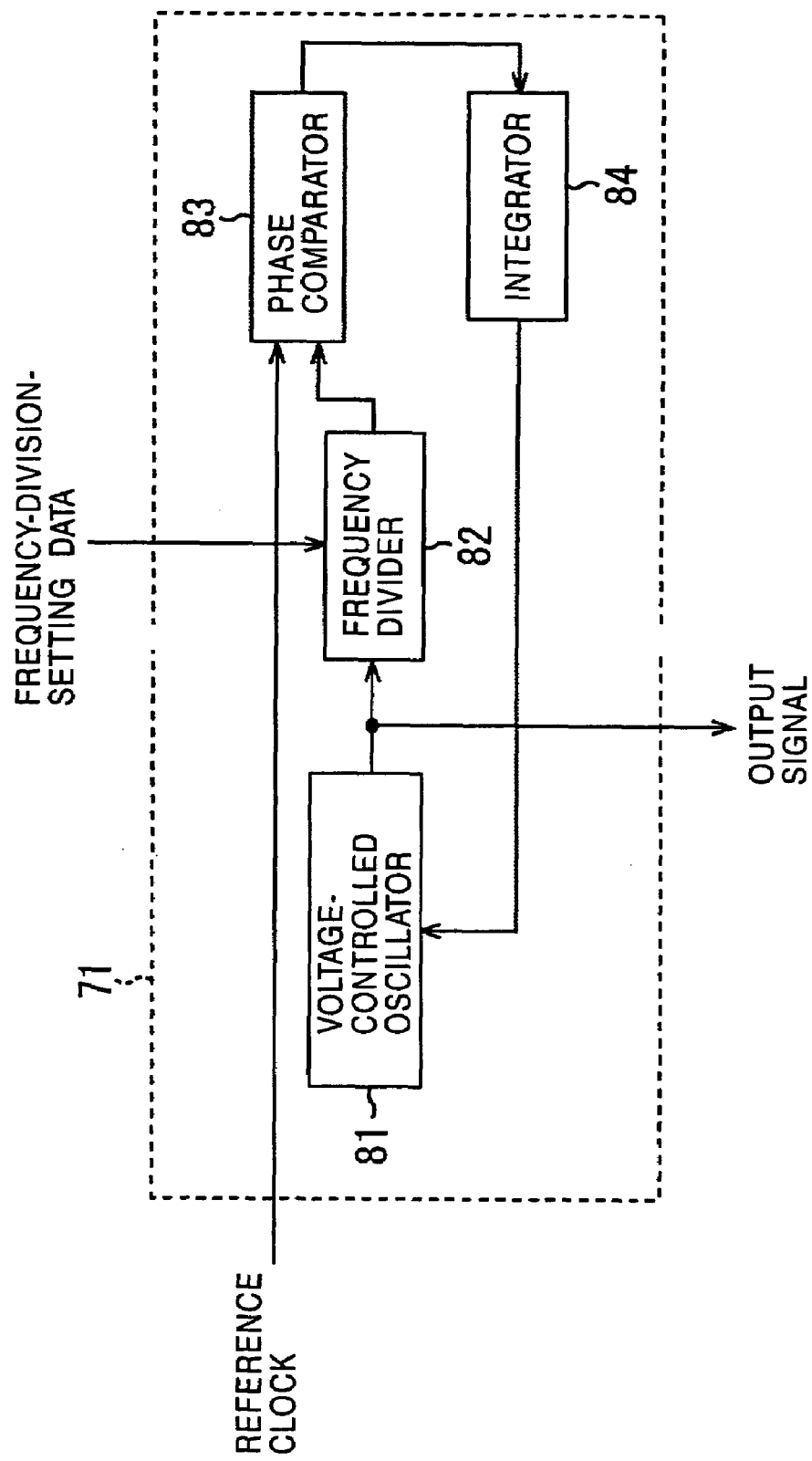
FIG. 7 is a block diagram showing an example configuration of a phase-locked loop (PLL) circuit.

FIG. 7 is a block diagram showing an example configuration of a phase locked loop (PLL) circuit 71. The transmission carrier frequency can also be controlled in accordance with the status of the cellular-phone functional block 41 by providing the arrangement shown in FIG. 7 in the transmission-carrier generating unit 52.

More specifically, an output signal (32.768 kHz) of an oscillator for real-time clock, usually mounted on a device capable of timekeeping, such as the cellular phone 1, is used as a reference clock, and a transmission-carrier-frequency switching signal output from the controller 51 is used as frequency-division-setting data for the PLL circuit 71.

A voltage-controlled oscillator 81 continuously changes its oscillation frequency according to a voltage applied by an integrator 84 to a control terminal, and outputs an oscillation signal to a frequency divider 82. The frequency divider 82 divides an output from the voltage-controlled oscillator 81 according to frequency-division-setting data supplied from the CPU 18, and outputs a resulting signal to a phase comparator 83.

The phase comparator 83 detects a phase difference between the reference clock and the signal input from the frequency divider 82, and outputs a phase-difference component representing the phase difference to the integrator 84 in the form of a pulsed phase-difference signal.

The integrator 84 (loop filter) commutates the phase-difference signal (cuts off high-frequency components), and outputs a resulting signal to the voltage-controlled oscillator 81.

Thus, an output signal of the voltage-controlled oscillator 81, generated by a feedback loop formed by the voltage-controlled oscillator 81, the frequency divider 82, the phase comparator 83, and the integrator 84, can be expressed by equation (11) below:

$$\text{(Frequency of output signal)} = \text{(Reference clock)} \times \text{(Frequency-dividing number)} \quad (11)$$

That is, since the controller 51 controls the frequency-dividing number that is set in the frequency divider 82, the frequency of output signal can be changed in steps of the resolution of the reference clock. Therefore, by using the output signal thus generated as a transmission carrier, the contactless-IC-card-reader/writer functional block 42 is allowed to carry out communication without affecting a wireless channel being used by the cellular-phone functional block 41.

As the reference clock, either the real-time clock for timekeeping or a clock generated in the cellular-phone functional block 41 may be used.

In an alternative arrangement, a transmission-carrier generating circuit shown in FIG. 8 is provided in the transmission-carrier generating unit 52. In that case, the capacitance of a capacitor 102, i.e., the load capacitance of an oscillator 103, is changed via a field-effect transistor (FET) 101 according to an output signal from the controller 51 (transmission-carrier-frequency switching signal) in accordance with the communication status of the cellular-phone functional block 41, thereby controlling the frequency of a transmission carrier output from a logic inverter 104. Obviously, in the transmission-carrier generating circuit shown in FIG. 8, the load capacitance of the oscillator 103 may be changed by controlling a voltage applied to a varicap diode, thereby controlling the frequency of transmission carrier.

In what has been described above, the cellular phone 1 includes a cellular-phone functional block for carrying out communications based on PDC Telecommunication System and a contactless-IC-card-reader/writer functional block, or a cellular-phone functional block for carrying out communications based on IMT-2000 DS-CDMA System and a contactless-IC-card-reader/writer functional block. However, without limitation thereto, the present invention can be applied to various information processing apparatuses including a plurality of functional blocks for carrying out communications based on specific communication standards.

The present invention can be applied to various devices, for example, a radio including a contactless-IC-card-reader/writer functional block, or a cellular phone with the functionality of a contactless-IC-card reader/writer, including a functional block for carrying out communications based on IEEE (Institute of Electrical and Electronics Engineers) 802.11a or 802.11b or a functional block for carrying out communications based on Bluetooth®.

Also in that case, the transmission carrier frequency of a contactless-IC-card-reader/writer functional block or other communication blocks is switched in accordance with the status of a first communication block so that communications by these block will not be mutually interfered with each other.

The series of processes described above may be executed either in hardware or in software.

When the series of processes is executed by software, a program constituting the software is installed via a network or a recording medium onto a computer embedded in special hardware or a general-purpose computer or the like that allows various functions to be executed with various programs installed thereon.

As shown in FIG. 1, the recording medium may be a package media having the program recorded thereon, distributed separately from a main apparatus unit to provide a user with the program, such as a magnetic disk 25 (including a flexible disk), an optical disk 26 (including a compact disk read-only memory (CD-ROM)) and a digital versatile disk (DVD)), a magneto-optical disk 27 (including a mini disk (MD®)), or a semiconductor memory 28. Alternatively, the recording medium may be a ROM 19 or the like having recorded the program thereon, distributed as included in advance in the main apparatus unit.

According to the present invention, steps that define the program recorded on the recoding medium may include processes that are executed in parallel or individually as well as processes executed in the order described above.

What is claimed is:

1. A wireless communication circuit comprising:
   receiving means for receiving a first electromagnetic wave having a first carrier frequency for communication based on a first wireless communication standard;
   transmitting means for transmitting a second electromagnetic wave having a second carrier frequency for communication based on a second wireless communication standard; and
   controlling means for controlling the second carrier frequency so that a frequency of an electromagnetic-interference wave that is generated by transmission of the second electromagnetic wave by the transmitting means does not fall within a predetermined frequency range with which reception sensitivity of the receiving means to the first electromagnetic wave is degraded.

2. A wireless communication circuit according to claim 1, further comprising a plurality of generating means for generating respectively different frequencies, wherein the controlling means controls the second carrier frequency by selecting one of the plurality of generating means.

3. A wireless communication circuit according to claim 1, further comprising generating means for generating different frequencies in accordance with change in a resonance frequency of an oscillator, wherein the controlling means controls the second carrier frequency by changing the resonance frequency.

4. A wireless communication circuit according to claim 1, further comprising generating means for generating different frequencies in accordance with change in a load capacitance of an oscillator, wherein the controlling means controls the second carrier frequency by changing the load capacitance.

5. A wireless communication circuit according to claim 1, wherein the controlling means controls the second carrier frequency by using a clock used by the receiving means or a real-time clock for timekeeping as a reference clock for a phase-locked loop circuit, and setting a frequency-dividing number for the phase-locked loop circuit.

6. A wireless communication circuit according to claim 1, wherein the controlling means determines that the reception sensitivity to the first electromagnetic wave is degraded by the electromagnetic-interference wave when the first carrier frequency has a value in a vicinity of an integer multiple of the second carrier frequency, and controls the second carrier frequency.

7. A wireless communication circuit according to claim 1, wherein the controlling means determines that the reception sensitivity to the first electromagnetic wave is degraded by the electromagnetic-interference wave when communication based on the first wireless communication standard is being carried out, and controls the second carrier frequency.

8. A wireless communication terminal comprising:
   receiving means for receiving a first electromagnetic wave having a first carrier frequency for communication based on a first wireless communication standard;
   transmitting means for transmitting a second electromagnetic wave having a second carrier frequency for communication based on a second wireless communication standard; and
   controlling means for controlling the second carrier frequency so that a frequency of an electromagnetic-interference wave that is generated by transmission of the second electromagnetic wave by the transmitting means does not fall within a predetermined frequency range with which reception sensitivity of the receiving means to the first electromagnetic wave is degraded.

9. A wireless communication terminal according to claim 8, further comprising a plurality of generating means for generating respectively different frequencies, wherein the controlling means controls the second carrier frequency by selecting one of the plurality of generating means.

10. A wireless communication terminal according to claim 8, further comprising generating means for generating different frequencies in accordance with change in a resonance frequency of an oscillator, wherein the controlling means controls the second carrier frequency by changing the resonance frequency.

11. A wireless communication terminal according to claim 8, further comprising generating means for generating different frequencies in accordance with change in a load capacitance of an oscillator, wherein the controlling means controls the second carrier frequency by changing the load capacitance.

12. A wireless communication terminal according to claim 8, wherein the controlling means controls the second carrier frequency by using a clock used by the receiving means or a real-time clock for timekeeping as a reference clock for a phase-locked loop circuit, and setting a frequency-dividing number for the phase-locked loop circuit.

13. A wireless communication terminal according to claim 8, wherein the controlling means determines that the reception sensitivity to the first electromagnetic wave is degraded by the electromagnetic-interference wave when the first carrier frequency has a value in a vicinity of an integer multiple of the second carrier frequency, and controls the second carrier frequency.

14. A wireless communication terminal according to claim 8, wherein the controlling means determines that the reception sensitivity to the first electromagnetic wave is degraded by the electromagnetic-interference wave when communication based on the first wireless communication standard is being carried out, and controls the second carrier frequency.

15. A wireless communication method comprising:
a receiving step of receiving a first electromagnetic wave having a first carrier frequency for communication based on a first wireless communication standard;
a transmitting step of transmitting a second electromagnetic wave having a second carrier frequency for communication based on a second wireless communication standard; and
a controlling step of controlling the second carrier frequency so that a frequency of an electromagnetic-interference wave that is generated by transmission of the second electromagnetic wave in the transmitting step does not fall within a predetermined frequency range with which reception sensitivity to the first electromagnetic wave in the reception step is degraded.

16. A recording medium having recorded thereon a computer-readable program that allows a computer to execute processing for receiving a first electromagnetic wave having a first carrier frequency for communication based on a first wireless communication standard, and processing for transmitting a second electromagnetic wave having a second carrier frequency for communication based on a second wireless communication standard, the program comprising a controlling step of controlling the second carrier frequency so that a frequency of an electromagnetic-interference wave that is generated by transmission of the second electromagnetic wave does not fall within a predetermined frequency range with which reception sensitivity to the first electromagnetic wave is degraded.

17. A computer-readable program that allows a computer to execute processing for receiving a first electromagnetic wave having a first carrier frequency for communication based on a first wireless communication standard, and processing for transmitting a second electromagnetic wave having a second carrier frequency for communication based on a second wireless communication standard, the program comprising a controlling step of controlling the second carrier frequency so that a frequency of an electromagnetic-interference wave that is generated by transmission of the second electromagnetic wave does not fall within a predetermined frequency range with which reception sensitivity to the first electromagnetic wave is degraded.

* * * * *

UNITED STATES PATENT AND TRADEMARK OFFICE
CERTIFICATE OF CORRECTION

PATENT NO. : 7,031,662 B2 Page 1 of 1
APPLICATION NO. : 10/676019
DATED : April 18, 2006
INVENTOR(S) : Mamoru Suzuki et al.

It is certified that error appears in the above-identified patent and that said Letters Patent is hereby corrected as shown below:

Column 2, line 24, change "+25" to --±25--

Column 8, line 66, change "+100" to --±100--

Signed and Sealed this

Fourteenth Day of November, 2006

JON W. DUDAS
*Director of the United States Patent and Trademark Office*